(12) United States Patent
Manavi

(10) Patent No.: US 6,724,711 B2
(45) Date of Patent: Apr. 20, 2004

(54) APPARATUSES AND METHODS FOR DIRECTING LIGHT BEAMS IN AN OPTICAL RECORDING SYSTEM

(75) Inventor: Mahdad Manavi, San Jose, CA (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/094,948

(22) Filed: Mar. 8, 2002

(65) Prior Publication Data

US 2002/0172135 A1 Nov. 21, 2002

Related U.S. Application Data

(60) Provisional application No. 60/274,416, filed on Mar. 9, 2001.

(51) Int. Cl.⁷ .................................................. G11B 7/00
(52) U.S. Cl. ................................. 369/112.28; 369/44.23
(58) Field of Search ...................... 369/44.23, 112.01, 369/112.21, 112.28, 112.29

(56) References Cited

U.S. PATENT DOCUMENTS

| 4,447,722 A | 5/1984 | Saimi |
| 4,793,696 A | 12/1988 | Suh |
| 5,115,420 A | 5/1992 | Finkelstein et al. |
| 5,150,347 A | 9/1992 | Yanagi |
| 5,278,813 A | * 1/1994 | Ohnishi et al. ........ 369/112.28 |
| 5,381,395 A | 1/1995 | Okada |
| 5,553,053 A | 9/1996 | Date |
| 5,719,846 A | 2/1998 | Matoba et al. |
| 6,141,301 A | 10/2000 | Oakley |

FOREIGN PATENT DOCUMENTS

JP         04362536 A      12/1992

* cited by examiner

*Primary Examiner*—Thang V. Tran
(74) *Attorney, Agent, or Firm*—Eric D. Levinson

(57) ABSTRACT

A rotatable optical wedge rotatable between a first position and a second position in an optical recording system directs a light beam to a position on a recording medium. The position of the incident light beam is adjustable by moving the optical wedge to different positions, including the first and second positions.

19 Claims, 6 Drawing Sheets

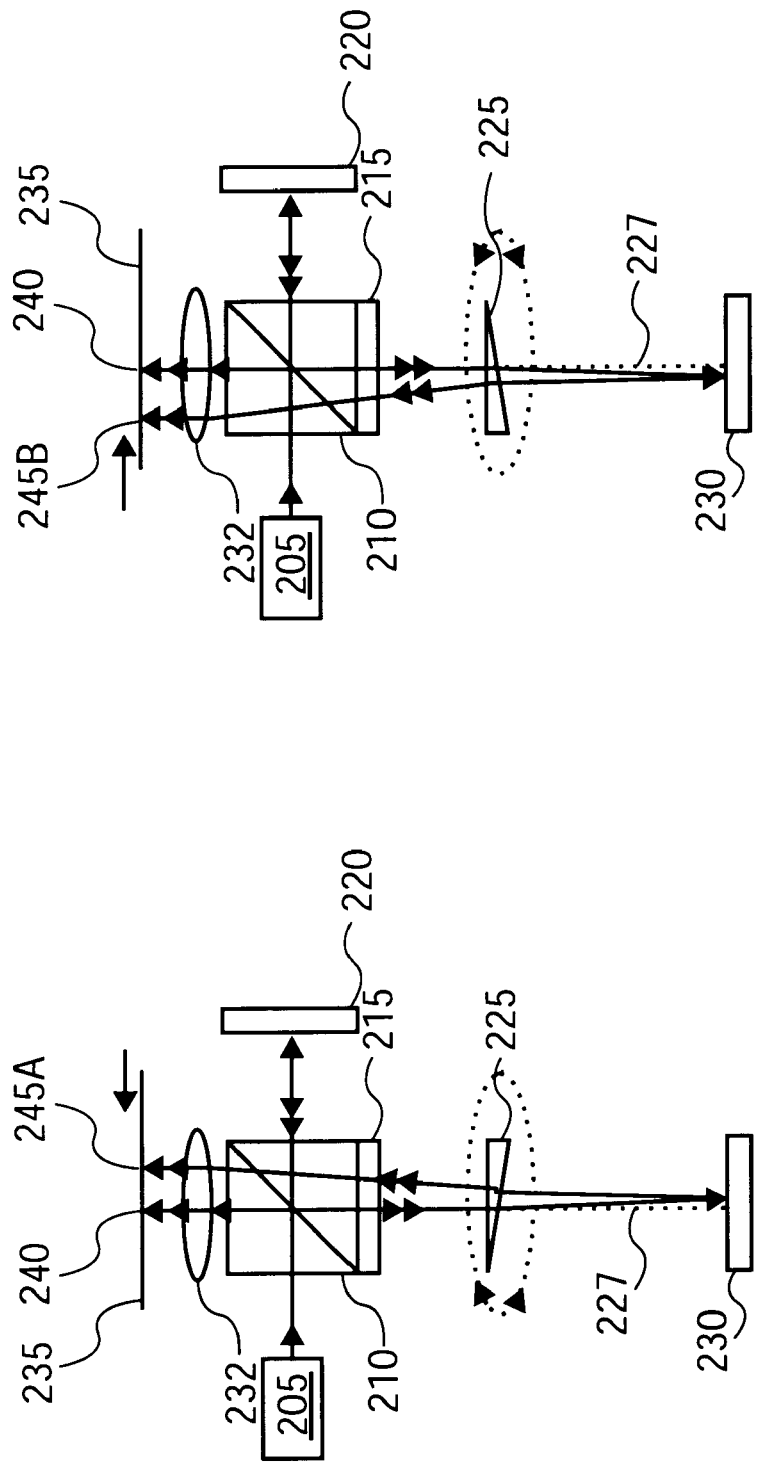

APPARATUSES AND METHODS FOR DIRECTING LIGHT BEAMS IN AN OPTICAL RECORDING SYSTEM

This application claims the benefit of Provisional Application No. 60/274,416, filed Mar. 9, 2001.

BACKGROUND OF THE INVENTION

1. Field of the Invention

The present invention relates generally to optical recording systems, and more specifically to positioning light beams within optical recording systems.

2. Description of the Related Art

Many data recording systems employ a means of reading the recorded data immediately after it is written onto the storage media so that the accuracy of the recorded data can be quickly ascertained. For example, in linear magnetic tape systems the read-write head array is duplicated within a single structure to enable immediate verification of the written data accuracy with the tape moving in either direction. In optical disc systems the verification function is usually implemented by reading the written data on a consecutive turn of the disc. Read-after-write (RAW) is a necessary function for any high fidelity data recorder and its implementation is therefore required in a linear optical tape recording system.

In a typical high data rate optical tape recording system the RAW function is complicated by simultaneous multi-track recording using multiple write beams, necessitating implementing multi-track RAW. For example, in a 64-beam recorder using a skewed 8×8 array of modulated optical beams, the RAW function requires a like array of 64 continuous beams to read the data. This beam array must position a read beam immediately down track of each write beam, for both directions of tape travel. Each of the read beams in the read array must be located exactly on the data bit-track written by the write beam array, and at a given distance down track. The entire read beam array must therefore be adjusted in both the down track and cross track directions. Although these two adjustments can be implemented by a two axis actuator, it is greatly beneficial if both adjustments can be obtained from a single axis actuator. It is also desirable to have the RAW function implemented by a physical device that is relatively insensitive to small mounting position errors and dynamic vibrations.

SUMMARY OF THE INVENTION

The present invention provides a rotatable wedge disposed relative to a reflective member oriented to reflect a light barn such that a the reflected light beam, upon passing through the rotatable wedge, is directed to a position on a recording medium according to a position of the rotatable wedge. The rotatable wedge is rotatable between at least a first position and a second position. In one embodiment of the present invention, the rotatable wedge is rotatable about an axis that is substantially orthogonal to the reflective member. In another embodiment the rotatable wedge is translatable in a direction substantially parallel to the reflective member.

Additional features, aspects and benefits of various embodiments of the present invention will become apparent upon review of the following description.

BRIEF DESCRIPTION OF THE DRAWINGS

Various embodiments of the present invention will be described in detail with reference to the following drawings. The present invention is illustrated by way of example and not limitation in the accompanying figures.

FIG. 2A illustrates another embodiment of an optical recording system having a rotatable optical wedge in accordance with the teachings of the present invention.

FIG. 2B illustrates the system of FIG. 2A with the rotatable optical wedge in another position.

DETAILED DESCRIPTION

A method and apparatus for directing light beams in an optical recording system is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Figure 1B:
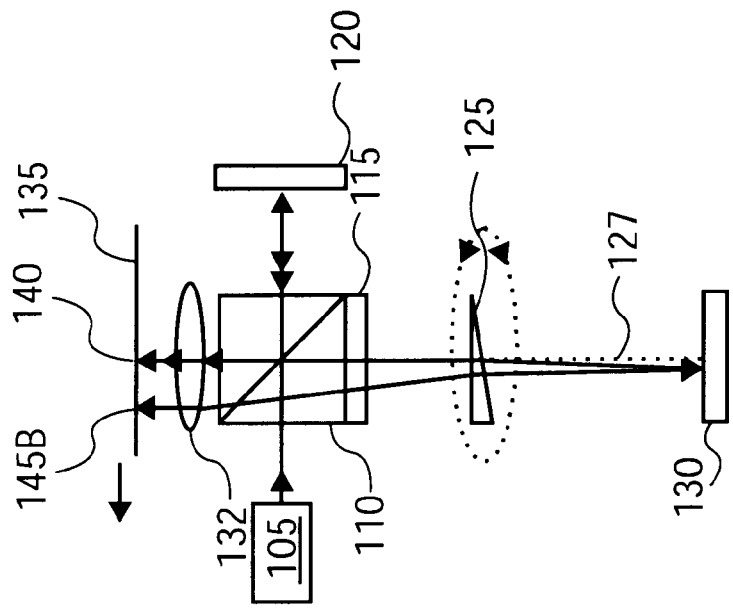
FIG. 1B illustrates the system of FIG. 1A with the rotatable optical wedge in another position.
Figure 1A:
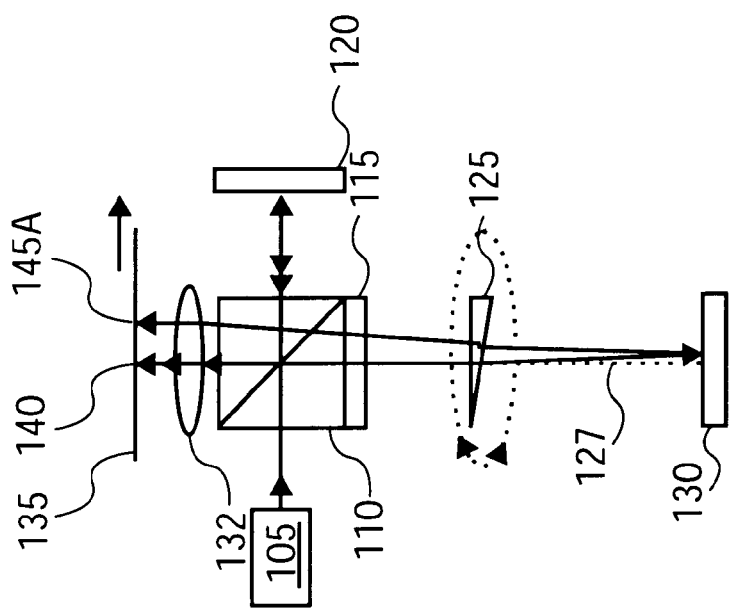
FIG. 1A illustrates one embodiment of an optical recording system having a rotatable optical wedge in accordance with the teachings of the present invention.

FIG. 1A illustrates one embodiment of an optical recording system having a rotatable optical wedge in accordance with the present invention. A light source 105 emits a light beam (e.g., a laser beam as part of a beam array) to a polarizing beam-splitter 110 which transmits a portion of the light beam to a light modulator 120. The modulated beam, which is a write beam, is returned to beam-splitter 110 and then reflected from beam-splitter 110 to a position 140 on a recording medium 135 such that a data track may be written on recording medium 135. Beam-splitter 110 reflects a portion of the light beam from light source 105 to a quarter-wave plate 115. The beam, which is a read beam, continues to an optical wedge 125 after passing through quarter-wave plate 115. When the read beam passes through optical wedge 125 and encounters the angled surface of optical wedge 125, the read beam becomes slightly offset in angle to the optical axis 127. The offset read beam then reflects from mirror 130 at a corresponding angle of reflection and returns to optical wedge 125, which readjusts the path of the read beam. After leaving optical wedge 125, the read beam passes through quarter-wave plate 115 and beam-splitter 110 and is incident upon a recording medium 135 at position 145a, in a path substantially parallel to optical axis 127. A focusing lens 132 focuses both the read and write beams onto recording medium 135. The position 145a of the read beam on recording medium 135 is dictated primarily by the orientation of wedge 125 and can be affected by the angle of the mirror 130. Read beam position 145a is shown "trailing" the position 140 of a write beam on recording medium 135.

Preferably, the beam splitters have properties such as s-polarization reflectance (RS) greater than ninety-eight percent (98%), and a p-polarization transmittance (TP) greater than ninety-seven percent (97%). Furthermore, the beam splitter may have a half-wave plate before it in some embodiments. One skilled in the art will appreciate that achieving a suitable ratio between read and write power for the respective beams is desired in this situation, and that the various components may be chosen or tuned accordingly. Note that the wedge angle and the index of refraction of the wedge are related, and can be tuned to the wavelength used in the system, as can the material (glass for example) of the wedge. Furthermore, it will be appreciated that a custom modulator may be preferable for use, due to the presence of an array of beams rather than a single beam. An embodiment of such a custom modulator may be found in U.S. Pat. No. 5,528,414 which is hereby incorporated herein by reference, a copy of which is attached to this application as Exhibit A. It will be appreciated that other modulators may be useful in practicing various embodiments of the invention. Each of these components (beamsplitter, wedge, and modulator) thus may be tuned, adjusted, or simply chosen based on design criteria for a given system.

Rotating optical wedge 125 approximately 180 degrees about optical axis 127 to the position shown in FIG. 1B positions the read beam at position 145b on the other side of the write beam position 140. Read beam position 145b is shown trailing the position 140 of a write beam on recording medium 135. It should be noted that recording medium 135 is moving in opposite directions in FIGS. 1A and 1B. Thus, optical wedge 125 is rotatable to position a read beam in a correct trailing position according to the direction of movement of recording medium 135. Accordingly, a RAW operation may be implemented for alternate directions of recording medium 135.

When optical wedge 125 is rotated between the positions shown in FIGS. 1A and 1B, the read beam position is on either side of the write beam position 140 along the same axis, thereby achieving a one-axis position adjustment. If optical wedge 125 is rotated slightly from one of positions 145a, 145b in either a clockwise or counter-clockwise direction, the read beam position moves in a cross-track direction for slight motions of the read beam. Thus, small rotations of optical wedge 125 permit incremental adjustment of a read beam position on recording medium 135 as the beam moves tangentially to the track.

The separation distance between the read beam position and a write beam position along the written track, trailing the write beam in either tape travel direction, is dependent only on the wedge index of refraction and the lens focal length by which the beams are focused onto the recording medium. The direction in which the read beams move is determined by the axis normal to the wedged surface of the wedge plate, and is nominally aligned along the bit (data) track in each of the 180 degree apart locations. The location of the read beam relative to the write beam is almost entirely dictated by the wedge angle, and is not sensitive to either wedge location or tilt. Furthermore, it should be noted that the optical wedge of some embodiments affects each beam in an array in the same manner so that the location of each read beam relative to its corresponding write beam is the same for all beams in the array.

The above description regarding FIGS. 1A and 1B concerns the situation where the write beam is centered on the optical axis and the read beam location is switched to the appropriate trailing position by rotating the optical wedge. In the embodiment shown in FIGS. 2A and 2B, the read beam is fixed on the optical axis 227, and the write beam is switched to the "lead" position ahead of the read beam for each direction of travel of recording medium 235.

A light source 205 emits a light beam (e.g., a laser beam as part of a beam array) to a polarizing beam-splitter 210 which reflects a portion of the light beam to a position 240 on recording medium 235. Position 240 is a fixed read position of the read beam reflected from beam-splitter 210. The portion of the light beam from light source 205 which passes directly through beam-splitter 210 continues on to a light modulator 220. The modulated beam, which is a write beam, is returned to beam-splitter 210 and then reflected from beam-splitter 210 through a quarter-wave plate 215 and then to an optical wedge 225. When the write beam passes through optical wedge 225 and encounters the angled surface of optical wedge 225, the write beam becomes slightly offset in angle to the optical axis 227. The offset write beam then reflects from mirror 230 at a corresponding angle of reflection and returns to optical wedge 225, which readjusts the path of the write beam relative to optical axis 227. After leaving optical wedge 225, the write beam passes through quarter-wave plate 215 and beam-splitter 210 and is incident upon recording medium 235 at position 245a to write a data track on recording medium 235. A focusing lens 232 focuses both the read and write beams onto recording medium 235. The position 245a of the write beam on recording medium 235 is similarly dictated by the refractive index of the wedge. Write beam position 245a is shown "leading" the position 240 of a read beam on recording medium 235.

Rotating optical wedge 225 approximately 180 degrees about optical axis 227 to the position shown in FIG. 2B positions the write beam at position 245b on the other side of the read beam position 240. Write beam position 245b is shown leading the position 240 of a read beam on recording medium 235. It should be noted that recording medium 235 is moving in opposite directions in FIGS. 2A and 2B. Thus, optical wedge 225 is rotatable to position a write beam in a correct leading position according to the direction of movement of recording medium 235. Accordingly, a RAW operation may be implemented for alternate directions of recording medium 235.

When optical wedge 225 is rotated between the positions shown in FIGS. 2A and 2B, the write beam position is on either side of the read beam position 240 along the same axis, thereby achieving a one-axis position adjustment. If optical wedge 225 is rotated slightly from one of positions 245a, 245b in either a clockwise or counter-clockwise direction, the write beam position moves in a substantially cross-track direction. Thus, small rotations of optical wedge 225 permit incremental adjustment of a write beam position on recording medium 235.

Figure 3:
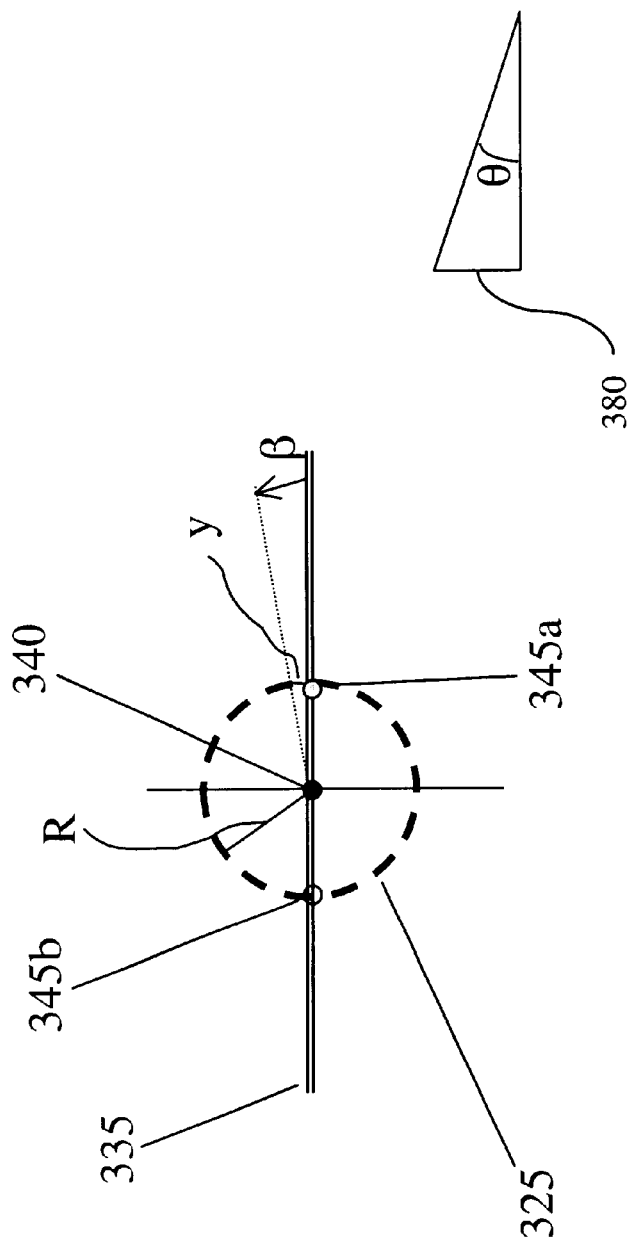
FIG. 3 illustrates possible positions of a light beam incident on a recording medium, where the light beam is directed by a rotatable optical wedge in accordance with the teachings of the present invention.

FIG. 3 illustrates possible positions of an adjustable light beam incident on a recording medium, where the adjustable light beam is directed by a rotatable optical wedge as discussed above in conjunction with FIGS. 1A, 1B, 2A and 2B. The position of the adjustable light beam incident on the recording medium may be located at any point along a circular path 325. As the rotatable optical wedge, such as wedges 125 and 225, is rotated clockwise or counterclockwise, the incident position of the adjustable light beam on the recording medium changes accordingly. Position 340 is a fixed position of another light beam incident on the recording medium. Positions 140 and 240 are examples of such a fixed position. Positions 345a, 345b are the alternate primary incident positions of the adjustable light beam on the recording medium when effecting a RAW operation. Positions 345a, 345b may be either trailing read beam positions or leading write beam positions relative to position 340 of a fixed write beam or a fixed read beam, respectively. It should be noted that positions 340, 345a and 345b are aligned on the same axis 335, which is typically the path of a written data track.

The radius R of circular path 325 may be defined by the following relationship:

$$R=2f\theta(n-1)$$

where f=focusing lens focal length

θ=wedge angle (in radians)

n=index of refraction of optical wedge

If the optical wedge is rotated through a small angle β from either of its positions which are associated with positions 345a, 345b of the incident adjustable light beam, then positions 345a, 345b move a short distance y away from axis 335. Distance y may be defined by the following relationship:

$$y=2\beta f\theta(n-1)$$

where β=small rotation angle (in radians)

f=focusing lens focal length

θ=wedge angle n=index of refraction of optical wedge

It should be noted that distance y may be used to measure the distance of positions 345a, 345b above and below axis 335. Wedge 380 is illustrated to show angle θ as it is used in the present calculations. It will be appreciated that angle θ is the angle between the surface at which a beam enters the wedge and the surface at which the beam exits the wedge.

Figure 4:
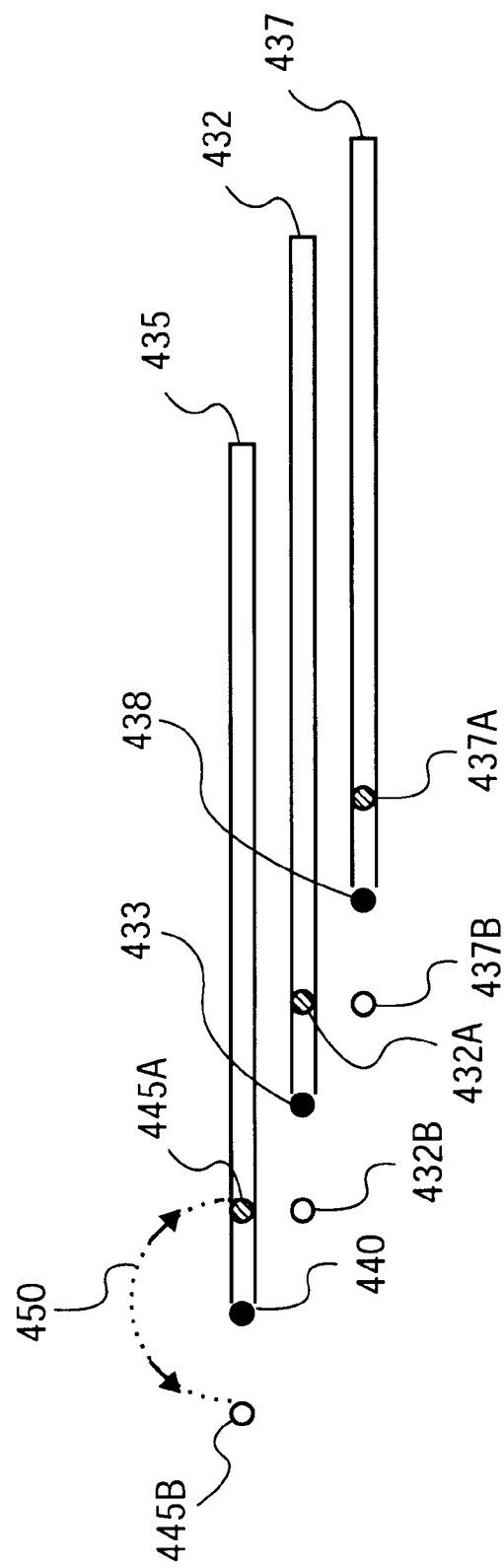
FIG. 4 illustrates an example of the positioning of read beams and write beams relative to each other on a recording medium in accordance with the teachings of the present invention.

FIG. 4 shows typical relative locations of incident read beams and write beams as data tracks are being recorded and a RAW operation is being applied. An array of read beams and write beams, and the write beams' corresponding data tracks 435, 432 and 437 are shown. In one embodiment, position 440 is the fixed position of an incident write beam and positions 445A, 445B are the alternate primary position is of an incident adjustable read beam. The position of the incident adjustable read beam moves through a circular path 450 as the rotatable optical wedge of the present invention is rotated. After the write read beams are positioned in a nominal location "ahead" of their corresponding write beam (for example, see FIGS. 1A and 1B) before recording beings, precise alignment of the read beams may be accomplished by a small rotation of the wedge plate. An example of this fine adjustment is described above in conjunction with FIG. 3. In one embodiment, the positions of the incident adjustable read beams in an array move in unison as the optical wedge is rotated because all of the read beams in the array pass through the optical wedge. Thus, a single optical wedge may be used to implement the RAW operation for each of data tracks 435, 432 and 437. It should be noted that position 440 may be the fixed position of an incident read beam, in which case positions 445a, 445b are the alternate primary positions of an incident adjustable write beam. Positions 433 and 438, these correspond to position 440, but are the positions of tracks 432 and 437. Similarly, positions 432A and 437A correspond to position 445A end positions 432B and 437B corresponds to position 445B for their respective tracks, and an arc similar to arc 450 may be described for each of the tracks 432 and 437.

Figure 5B:
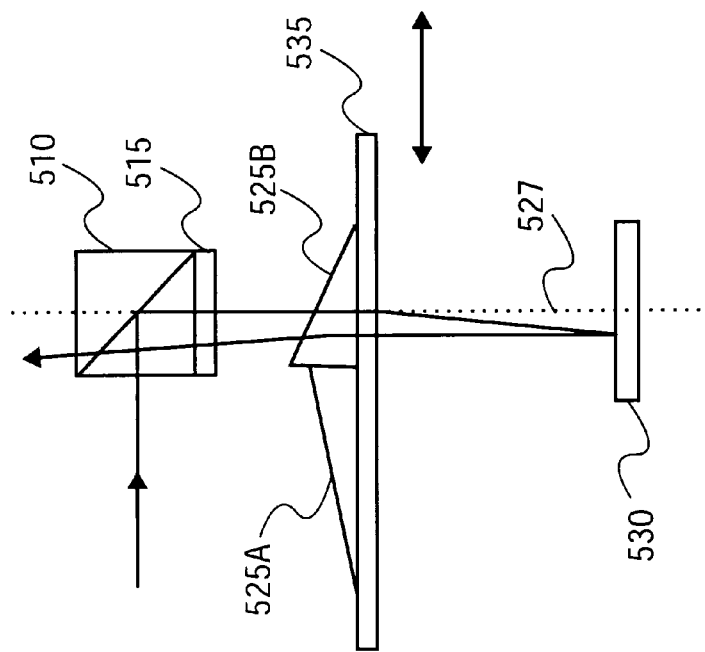
FIG. 5B illustrates the system of FIG. 5A with the translatable optical wedges in shifted positions.
Figure 5A:
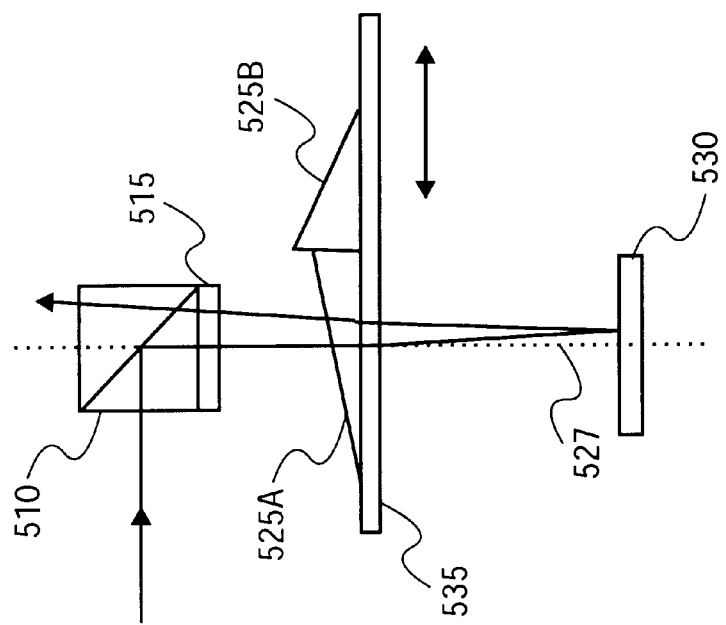
FIG. 5A illustrates one embodiment of an optical recording system having translatable optical wedges in accordance with the teachings of the present invention.

FIGS. 5A and 5B illustrate another embodiment of the present invention which may be used to direct light beams in an optical recording system. Two wedges 525a, 525b are located on a translatable, optically clear substrate 535 such that either wedge 525a, 525b can be positioned in the path of a light beam. A polarizing beam-splitter 510 receives a light beam from a light source (not shown) and reflects a portion of the beam through a quarter-wave plate 515 and on to wedge 525a or 525b. The angled surface of the wedge 525a, 525b alters the path of the light beam by offsetting it at an angle from axis 527. The deviated beam is then incident at an angle upon a flat mirror 530, which reflects the beam at a matching angle of reflection back to the optical wedge 525a, 525b. The beam passes through the optical wedge 525a, 525b again, as well as quarter-wave plate 515 and beam-splitter 510, and is ultimately focused on to a recording medium. The wedges do not need to have the same wedge angle, and each wedge may offset a light beam in either direction relative to the optical axis (e.g., axis 527). It should be noted that only one light beam is shown for the purposes of clarity. Typically, beam-splitter 510 transmits a portion of the initially received light beam in addition to reflecting a portion of such light beam.

Figure 6:
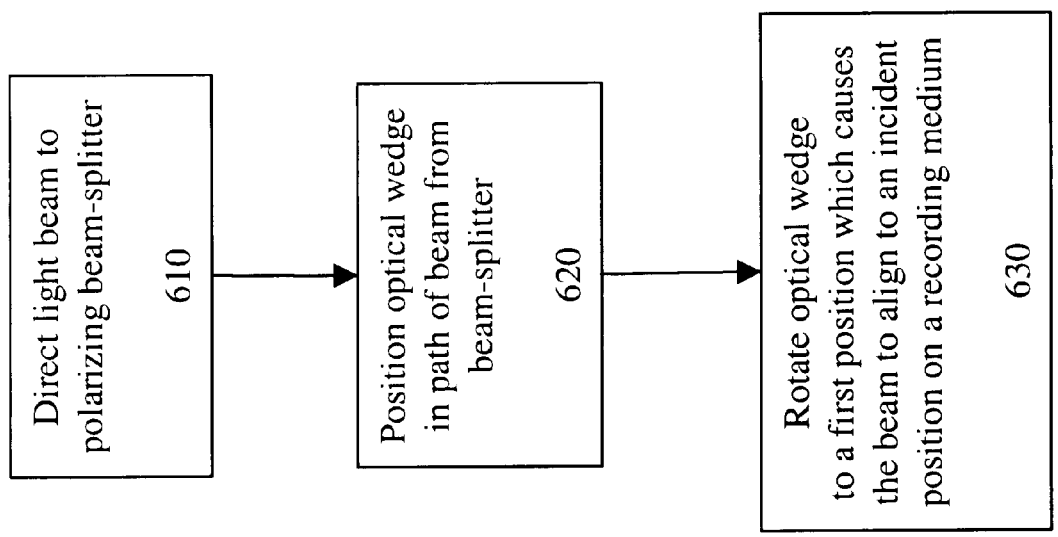
FIG. 6 illustrates an embodiment of a method of performing a read after write operation.

FIG. 6 illustrates an embodiment of a method of performing a read-after-write operation in an optical recording system. At block 610, a light beam is directed to a polarizing beam-splitter to split the light beam into a first portion and a second portion. At block 620, an optical wedge is positioned in the path of one of the first and second portions reflecting from the polarizing beam-splitter (the first portion of the split light beam for example). At block 630, the optical wedge is rotated to a first position, such that the optical wedge directs one of the first and second portions (the first portion for example) to a mirror and the one of the first and second portions (again the first portion for example) returns to the optical wedge to be aligned to an incident position on a recording medium. As will be appreciated, this method may be performed with the embodiments of the apparatus previously described. Furthermore, note that the wedge may be rotated based on the direction of travel of a recording medium, for example.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 1A may be integrated into components, or may be subdivided into components. As another example, although the rotatable wedge of the present invention is useful for implementing RAW operations in an optical recording system, the present invention is not limited to such an implementation. Similarly, the blocks of FIG. 6 (for example) represent portions of a method which, in some embodiments, may be reordered or may be organized in parallel rather than in a linear or step-wise fashion. The present specification and figures are accordingly to be regarded as illustrative rather than restrictive.

What is claimed is:

1. An optical apparatus comprising:
   a reflective member oriented to reflect a light beam; and
   a first rotatable wedge disposed relative to the reflective member such that the reflected light beam, upon passing through the first rotatable wedges is directed to a position on a recording medium according to a position of the first rotatable wedge.

2. The optical apparatus of claim 1, wherein the first rotatable wedge is rotatable between at least a first position and a second position.

3. The optical apparatus of claim 2, wherein the reflected light beam is directed to a first position on the recording medium when the first rotatable wedge is in the first position, and wherein the reflected light beam is directed to a second position on the recording medium when the first rotatable wedge is in the second position.

4. The optical apparatus of claim 3, wherein the first and second positions of the reflected light beam are read positions to read a written truck on the recording medium.

5. The optical apparatus of claim 3, wherein the first and second positions of the reflected light beam are write positions.

6. The optical apparatus of claim 1, wherein the first rotatable wedge is rotatable about an axis substantially orthogonal to the reflective member.

7. The optical apparatus of claim 1, wherein the first rotatable wedge is translatable in a direction substantially parallel to the reflective member.

8. The optical apparatus of claim 7, further comprising a second rotatable wedge, wherein the second rotatable wedge is translatable in unison with the first rotatable wedge.

9. The optical apparatus of claim 8, wherein the first rotatable wedge comprises a first wedge angle and the second rotatable wedge comprises a second wedge angle different from the first wedge angle.

10. An optical recording apparatus comprising:
    a light source to emit a first light beam;
    a beam-splitting component positioned to receive the first light beam;
    a rotatable wedge positionable within the path of a reflected portion of the first light beam from the beam-splitting component to direct the reflected portion to a mirror;
    the mirror directing the reflected portion back to the rotatable wedge such that the reflected portion is incident upon a recording medium.

11. The optical recording apparatus of claim 10, further comprising a quarter-wave plate located between the beam-splitting component and the rotatable wedge.

12. The optical recording apparatus of claim 11, further comprising a light modulator positioned to receive a transmitted portion of the first light beam from the beam-splitting component, the light modulator returning a modulated light beam to the beam-splitting component.

13. The optical recording apparatus of claim 10, wherein the rotatable wedge is rotatable between at least a first position and a second position.

14. The optical recording apparatus of claim 13, wherein the first and second positions of the rotatable wedge determine a position of the reflected portion of the first light beam upon the recording medium.

15. The optical recording apparatus of claim 13, wherein the rotatable wedge is coupled to a rotary actuator.

16. The optical recording apparatus of claim 13, wherein the first and second positions of the rotatable wedge are located approximately 180 degrees apart from each other.

17. The optical recording apparatus of claim 10, wherein the rotatable wedge is coupled to a translatable substrate.

18. A method of performing a read-after-write operation in an optical recording system, the method comprising:
    directing a light beam to a polarizing beam-splitter to split the light beam into a first portion and a second portion;
    positioning an optical wedge in the path of one of the first and second portions reflecting from the polarizing beam-splitter;
    rotating the optical wedge to a first position, the optical wedge directing the one of the first and second portions to a mirror such that the one of the first and second portions returns to the optical wedge to be aligned to an incident position on a recording medium.

19. The method of claim 18, wherein the rotating is performed based on a direction of movement of the recording medium.

* * * * *